(No Model.)
C. B. & O. B. PARKER & B. P. GROVER.
CARD GRINDING MACHINE.
No. 286,633. Patented Oct. 16, 1883.
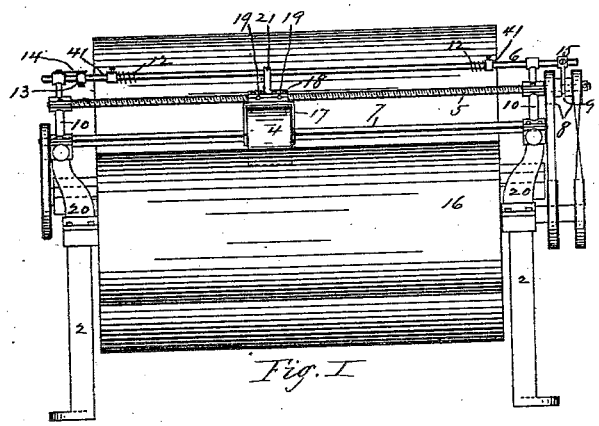
Fig. I.
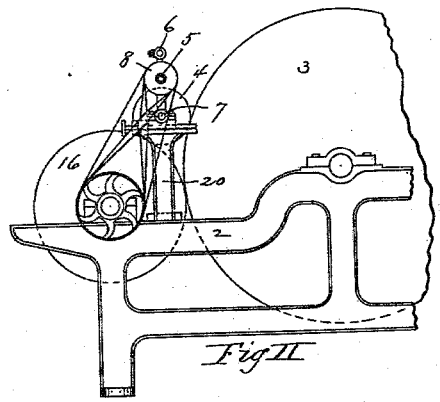
Fig. II.
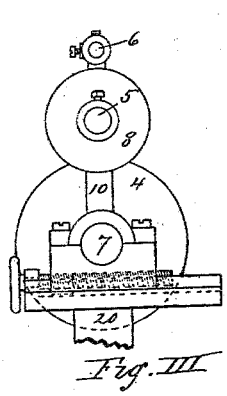
Fig. III.
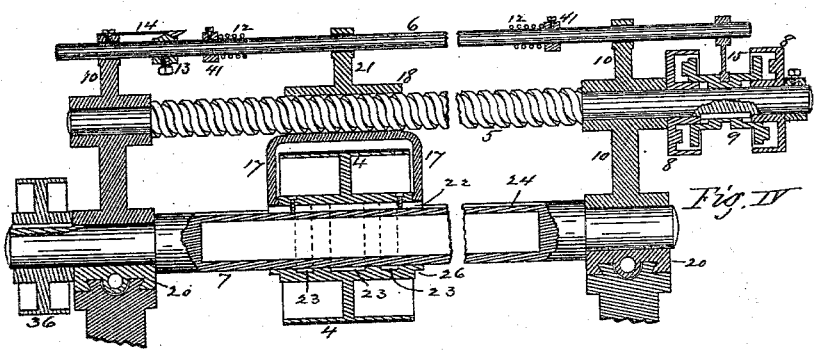
Fig. IV.
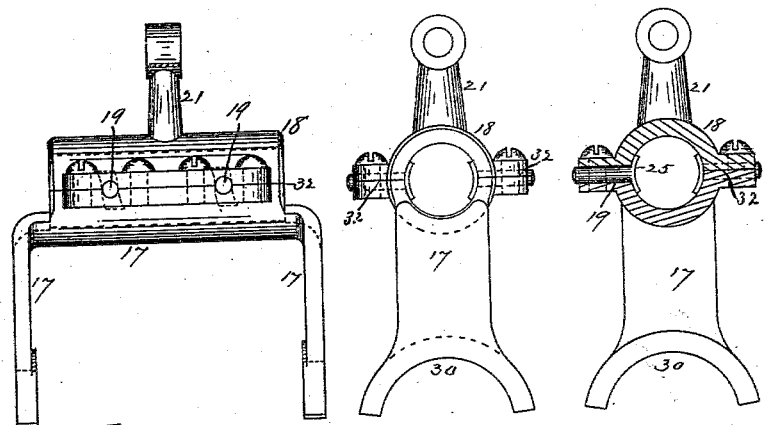
Fig. V.   Fig. VI.   Fig. VII.
Witnesses.
Chas H. Wood.
E. B. Dickinson.
Inventors.
Charles B. Parker.
Onesiphorus B. Parker.
Benjamin P. Grover.
By T. Alleutus,
their Atty.

UNITED STATES PATENT OFFICE.

CHARLES B. PARKER AND ONESIPHORUS B. PARKER, OF SOUTH HADLEY, AND BENJAMIN P. GROVER, OF HOLYOKE, MASSACHUSETTS.

CARD-GRINDING MACHINE.

SPECIFICATION forming part of Letters Patent No. 286,633, dated October 16, 1883.

Application filed June 28, 1883. (No model.)

*To all whom it may concern:*

Be it known that we, CHARLES B. PARKER and ONESIPHORUS B. PARKER, of South Hadley, in the county of Hampshire, and BENJAMIN P. GROVER, of Holyoke, in the county of Hampden, all in the State of Massachusetts, have invented a new and useful Improvement in Card-Grinding Machines, of which the following is a specification and description.

The object of our invention is to facilitate the removal of the carrier and the removable sectional threads from the screws when required for any purpose and of replacing them again; to remove and collect the dust and dirt which accumulates on the driving or operating shaft, and thereby preserve the finished bearing-surfaces of the grinding-wheel and of the operating-shaft; to cause the grinding-wheel to be revolved at a higher rate of speed and with a uniform and steady rotary movement and greater freedom from jar or vibration; and to insure the proper engagement of the clutch with the clutch-pulley at each movement of the shifting-rod; and we accomplish this by the mechanism, substantially as hereinafter described, and illustrated in the accompanying drawings, in which—

Figure I is a front view of the main card-cylinder, doffer, and frame, with our machine attached thereto in position for grinding the cylinder and doffer at the same time. Fig. II is an end view of so much of the same as is necessary to show our machine as applied thereto. Fig. III is an end view of our machine. Fig. IV is a vertical longitudinal section of our machine at the axis of the driving-shaft, and showing a sectional view of the main portion of the driving-shaft. Fig. V is a front view of the carrier. Fig. VI is an end view of the same; and Fig. VII is a transverse section of the same at line A, showing the manner of securing the removable sectional threads in the carrier.

In the drawings, 2 represents the frame, in which the main card-cylinder and the doffer-cylinder have their journal-bearings, and upon which the lower supports, 20, for our machine are fixed, which support the bearings in which the shaft 7 revolves. This shaft 7 we make hollow, as shown in Fig. IV, but with both its ends stopped by welding or by shrinking in a plug at each end; and we make this shaft so that when the spline 24 is cut therein and the shaft is turned up in a lathe it is tubular or hollow for the greater part of its length, except at the ends or at its bearings, and with its shell entire in the direction of its circumference, and closed for its whole length, and a driving-pulley, 36, is secured thereto at one end, by which it may be rapidly driven or rotated by a belt.

The grinding-wheel 4 may consist, preferably, of a metallic shell, connected with its hub by a web, to make the wheel sufficiently light, and we make any desired number of chambers, 23, (either one or more,) in the interior surface of the hub of this grinding-wheel, (preferably of annular form,) and extending entirely around the inside of the hub. A longitudinal groove is also made in the hub, into which is inserted a key, 22, which may be secured by two small screws, or in any other convenient manner, which key is adapted to slide along in the spline 24, so that when the shaft 7 is revolved the grinding-wheel will be made to revolve also.

A screw-shaft, 5, is secured to revolve in its bearings in the standards 10, with two clutch-pulleys, 8, adapted to be revolved in opposite directions by belts, with a grooved sliding clutch, 9, located on the shaft between them; and a carrier, 17, having a longitudinal hole through its head, through which extends this screw-shaft 5, is provided with a forked arm at each end, as at 30, which fits a groove or annular channel, 26, at each end of the hub of the grinding-wheel, but so that said wheel may revolve freely, and yet be moved along its shaft easily by the arm of said carrier. The head of this carrier we make in two parts—that is to say, it is divided, as at the line 32—with a cap, 18, and flanges on each side, and screws or bolts to secure the two parts together at the flanges, as shown clearly in Figs. V, VI, and VII; and we make recesses in these flanged parts where they come together, as at 19, in Fig. VII, so that the removable sectional threads 25, which may have a head more or less elongated to fit between the threads of the screw 5, and a shank, preferably cylindrical, to fit a corresponding recess, 19, when the cap 18 is removed, may be laid each in its recess, and when the cap is readjusted in position, the removable sectional threads are secured in place.

A sliding rod, 6, is arranged to move longitudinally in bearings in the standards 10, above the screw-shaft 5; and an arm, 21, made on the upper part of the carrier-head, or of its cap 18, is provided with a hole at the upper end, through which extends this rod 6, with an adjustable dog, 41, secured, preferably by a set-screw, at any desired point along the rod, on either side of the arm 21, as shown in Fig. IV. A spring, 12, is placed on the rod and against each dog, on the side of the latter nearest the arm 21, to break the force of the blow of the arm against the dog at each movement of the carrier; and an arm, 15, engages in an annular groove in the clutch 9, the latter being secured to that end of the screw-shaft 5 by a spline and key, but so as to slide freely along that portion of said shaft between the loose clutch-pulleys 8.

A double incline, 13, which consists, preferably, of a block secured on the rod 6 by a set-screw, and which is inclined from its middle portion, at the top, downward each way in the direction of the length of the rod 6, is adjusted in the desired position at a suitable distance from one of the standards 10, and a spring-catch, 14, is secured to the standard, with its beveled catch bearing on the incline, as shown clearly in Fig. IV. The object of this double incline and spring-catch is to insure the full engagement of the teeth of the clutch 9 with those of each clutch-pulley, 8, at each movement of the carrier. For example, if, at any contact of the arm 21 against the spring 12 and dog 41, the rod 6 was moved lengthwise by the carrier, and the clutch-teeth were disengaged from those of one pulley, and the opposite teeth did not quite engage, this movement of the rod 6 would move one of the inclines out from beneath the beveled end of the spring-catch, the latter riding over the apex onto the opposite incline, where it would remain bearing thereon near its upper end, and holding the rod and the clutch 9 in that position, pressing the teeth of the clutch and clutch-pulley together until they did engage. Otherwise the clutch might remain stationary between the pulleys and disengaged from both, until the operator should discover it and move the rod over with his hand; but with this appliance attached, the changes of the rod, made by the alternate movements of the carrier, insure the perfect automatic operation of the machine, so that when once set and started to grind the card or doffer, it may be left all day, if desired, without any attention from the operator.

The machine may be attached to a carding-frame with the periphery of the grinding-wheel 4 just in contact with the teeth of both the doffer and the cylinder-card, or of only one of them, if desired; and when adjusted properly the belt around the driving-pulley 36 of the shaft 7 revolves the latter and the grinding-wheel 4 thereon at great speed. A belt around one of the clutch-pulleys 8 drives the latter in one direction, and a crossed belt, or one moving in the other direction around the other pulley 8, will move the latter in the opposite direction, both pulleys revolving on the shaft 5. The clutch 9, when moved against and into engagement with one of the said pulleys 8, will cause the screw-shaft 5 to revolve in one direction, and the removable sectional threads engaging in the thread of the screw, the carrier 17 and grinding-wheel 4 will be moved steadily along toward the other end of the machine, the wheel 4 sliding along on the shaft 7. As the carrier is thus moved along, its arm 21 strikes against the spring 12, and dog 41, secured on the rod 6, and the latter is moved lengthwise, causing its arm 15 to move the clutch 9 into engagement with the other pulley to reverse the rotary movement of the screw-shaft, and the beveled end of the spring-catch 14, riding over onto the other incline on the piece 13, holds the rod in that position and insures the engagement of the clutch and its pulley, and the reversal of the rotary movement of the screw-shaft, and the carrier and grinding-wheel are moved along steadily in the other direction until contact of the arm 21 against the other spring 12 and dog 41, and the clutch is again shifted and the screw-shaft again reversed in its rotary movement, and so on.

In all manufactories where machines of this kind are used there are large quantities of dust floating in the atmosphere, which accumulates fast on the large shaft 7, and the grinding-wheel 4, if fitted snugly to said shaft, as it should be to run steadily and without jar and vibration every time it moved along the shaft, would remove all the accumulation of dust and dirt, and this would collect rapidly on the interior bearing-surface of the hub of the grinding-wheel 4 between it and the shaft 7, and would finally interfere with the proper running of the grinding-wheel. To obviate any trouble from this source, we form the chambers, one or more and of any desired size, in the hub of the grinding-wheel, into which the dust and dirt are removed by the sliding movement of the wheel along the shaft, so that this dust and dirt do not collect and remain between the bearing-surface of the inside of the hub and the shaft 7; and, when desired, the grinding-wheel may be removed from the shaft, and the chambers cleaned out, and the bearing-surface of the hub, as well as the exterior finished surface of the shaft 7, will be left intact and uninjured by any collection of dirt and dust.

We are aware that a tubular or hollow shaft has heretofore been used in card-grinding machines; but such shafts have been slotted entirely through one side of the tubular shaft for the entire length of movement of the grinding-wheel. When a tubular or hollow shaft which is cut entirely through one side almost its whole length is revolved at a high rate of speed—especially when carrying a load, as a grinding-wheel—this slot is opened and the diameter of the shaft is increased, but only in one direction to any appreciable extent, and the shaft is thereby thrown out of balance, and runs with a very preceptible jar or vibration, besides increasing the friction of the grinding-wheel on its driving-shaft. In our device, however, we maintain the perfect tubular character of the driving-shaft, as the spline 24 is only cut in a very little distance from the exterior surface, and the shaft may be driven at any desired rate of speed without changing in the least its perfect tubular form or increasing the friction of the grinding-wheel moving thereon. The result is that we are able to run the machine at a very much higher rate of speed than any other machine now made, having a hollow shaft slotted its entire length of movement of the grinding-wheel, and with a perfect uniformity in steadiness of movement. The method of placing the removable sectional threads 25 in their recesses in the head of the carrier we deem to be of great advantage over any other arrangement for causing the carrier to engage with and be moved by the screw, as their shanks, being out of reach of dust and dirt, are not liable to get clogged, and they will always readily adjust themselves to the thread of the screw; and if their heads should become worn or need repair they may be easily removed and repaired, or new ones be substituted, by simply removing the cap 18; and they can be placed in perfect adjustment with the screw when the cap is removed, which cannot be done in any other card-grinding machine now in use.

Having thus described our invention, what we claim as new is—

1. In an improved card-grinding machine, the combination of a hollow or tubular shaft whose shell is continuous in the direction of its circumference, and with a spline made therein and adapted to revolve in bearings in the machine one bearing at each end of said shaft, and a grinding-wheel fitted with a feather or key to slide in said spline, and whose grinding-surface is on the periphery of said wheel, and fitted to and adapted to revolve with and slide along upon said tubular shaft from end to end between its said bearings during its revolution, substantially as described.

2. In an improved card-grinding machine, the combination of a shaft, a grinding-wheel adapted to revolve with and to move along said shaft, and whose hub is provided at its bearing portion with a dust and dirt chamber, to collect and contain the dust and dirt from the exterior surface of said shaft as said wheel moves thereon, substantially as described.

3. In an improved card-grinding machine, the combination of a driving-shaft, a grinding-wheel fitted to and adapted to revolve with said shaft, an operating screw-shaft, a carrier moved by said screw-shaft, and provided with arms embracing said grinding-wheel to move it along said driving-shaft while said wheel is revolving therewith, and provided with a flanged cap and with recesses therein, and removable sectional threads fitted into said recesses and engaging with the thread of said screw, substantially as described.

4. In an improved card-grinding machine, the combination, with a driving-shaft, of a grinding-wheel adapted to revolve with and to move along said shaft, an operating-screw shaft, a carrier moved by said screw-shaft, a shifting-rod adapted to be moved lengthwise in both directions by said carrier, and a double incline and co-operating spring-catch connected with said shifting-rod to secure said rod in its shifted position at each movement of the carrier, substantially as described.

CHARLES B. PARKER.
ONESIPHORUS B. PARKER.
BENJAMIN P. GROVER.

Witnesses:
T. A. CURTIS,
CHAS. H. WOOD.